United States Patent [19]

Eisenberg et al.

[11] Patent Number: 5,572,671

[45] Date of Patent: Nov. 5, 1996

[54] METHOD FOR OPERATING APPLICATION SOFTWARE IN A SAFETY CRITICAL ENVIRONMENT

[75] Inventors: Alan J. Eisenberg, Monmouth Junction, N.J.; Alexander M. Adelson, Cortlandt Manor, N.Y.

[73] Assignee: Base Ten Systems, Inc., Trenton, N.J.

[21] Appl. No.: 389,858

[22] Filed: Feb. 17, 1995

[51] Int. Cl.⁶ .................................................. G06F 11/00
[52] U.S. Cl. ................................ 395/184.01; 364/570
[58] Field of Search ......................... 395/184.01, 185.01, 395/183.15; 340/605; 364/570

[56] References Cited

U.S. PATENT DOCUMENTS

| | | | |
|---|---|---|---|
| 4,582,671 | 4/1986 | Rindo | 376/251 |
| 5,210,526 | 5/1993 | Imperiali | 340/605 |
| 5,339,261 | 8/1994 | Adelson et al. | 364/570 |

*Primary Examiner*—Robert W. Beausoliel, Jr.
*Assistant Examiner*—Ly V. Hua
*Attorney, Agent, or Firm*—Sprung Horn Kramer & Woods

[57] ABSTRACT

A method for operating application software in a safety critical environment, comprises loading application software into a computing system, linking the computing system to a set of safety critical rules to verify that the safety critical operations performed by the computing system satisfy rule criteria and running the application software in the computing system. Safety critical operations are performed as background functions during the running of the application software and if a failure to satisfy criteria for a safety critical operation is detected, the system determines the application specific operation being currently performed. The criteria, the action to be taken or both is dynamically adjusted if the currently performed application specific operation is critical operation.

8 Claims, 3 Drawing Sheets

METHOD FOR OPERATING APPLICATION SOFTWARE IN A SAFETY CRITICAL ENVIRONMENT

BACKGROUND OF THE INVENTION

The present invention relates to a method for operating application software in a safety critical environment.

Computing systems, in particular microprocessor controlled systems including as those described in copending application Ser. No. 08/354,971, filed Dec. 13, 1994, are prevalent in medical devices, such as MRI imaging systems, x-ray systems, blood testing equipment, ventilators, etc. These systems now require a safety critical environment for the protection of patients.

Typically, a computing system has application software loaded therein which runs in conjunction with an operating system and a central processor to carry out application specific operations. In an MRI system, the application software will prompt the user for inputs relating to patient data, tests to be performed, etc., control the magnet to apply the magnetic field to the patient for a specific time period with a particular pulse sequence and thereafter interpret the data and display images for the physician.

It should be clear that the safety criticality of various application specific functions will differ. In an MRI system, for example, if a safety critical error is detected in the computing system during the entry of data or during the interpretation of data after the scan has been performed, the system can react according to safety critical rules by halting the program in the background to do further testing, temporarily halt the program and prompt the user that an error has been detected and give the user the opportunity to continue, or permanently stop the program. None of these measures would directly affect the health or safety of the patient. However, if an error was detected during the application of the magnetic field, the aforementioned measures could result in prolonging field exposure which could have a disastrous effect on the patient's health and safety.

Another example is the use of a ventilator. When the machine is on standby, the detection of a safety critical error can result in a halting of the system as long as the user is notified of this fact. However, when the machine is in continuous use, even temporarily halting its operation could result in the death of a patient.

While the system described in the aforementioned copending application establishes a safety critical environment by having the application software provide a set of safety critical rules for the computing system, those rules do not differentiate between different application specific functions being carried out by the application software.

SUMMARY OF THE INVENTION

The main object of the present invention is to provide an improved method for operating application software in a safety critical environment.

Another object of the present invention is to provide a method for operating application software in a safety critical environment wherein a set of safety critical rules for the application software is able to change dynamically with the operation of the application software.

These and other objects are achieved in accordance with the present invention by a method for operating application software in a safety critical environment comprising the steps of loading application software into a computing system and including a set of safety critical rules for the application software corresponding to criteria for safety critical operations to be performed by the computing system and actions to be taken in response to a failure to satisfy the criteria. The computing system is linked to the set of safety critical rules to verify that the safety critical operations performed by the computing system satisfy the criteria. The application software is run in the computing system, wherein the application software performs a plurality of application specific operations having differing levels of safety criticality. Safety critical operations are performed as background functions during the running of the application software and when a failure to satisfy criteria for a safety critical operation is detected, the method first determines which application specific operation the application software is currently performing and then adjusts the criteria, the action to be taken or both if the currently performed application specific operation is a predetermined operation.

These and other objects and advantages of the present invention will be described in more detail with regard to the attached drawings wherein:

DETAILED DESCRIPTION OF THE INVENTION

Figure 1:
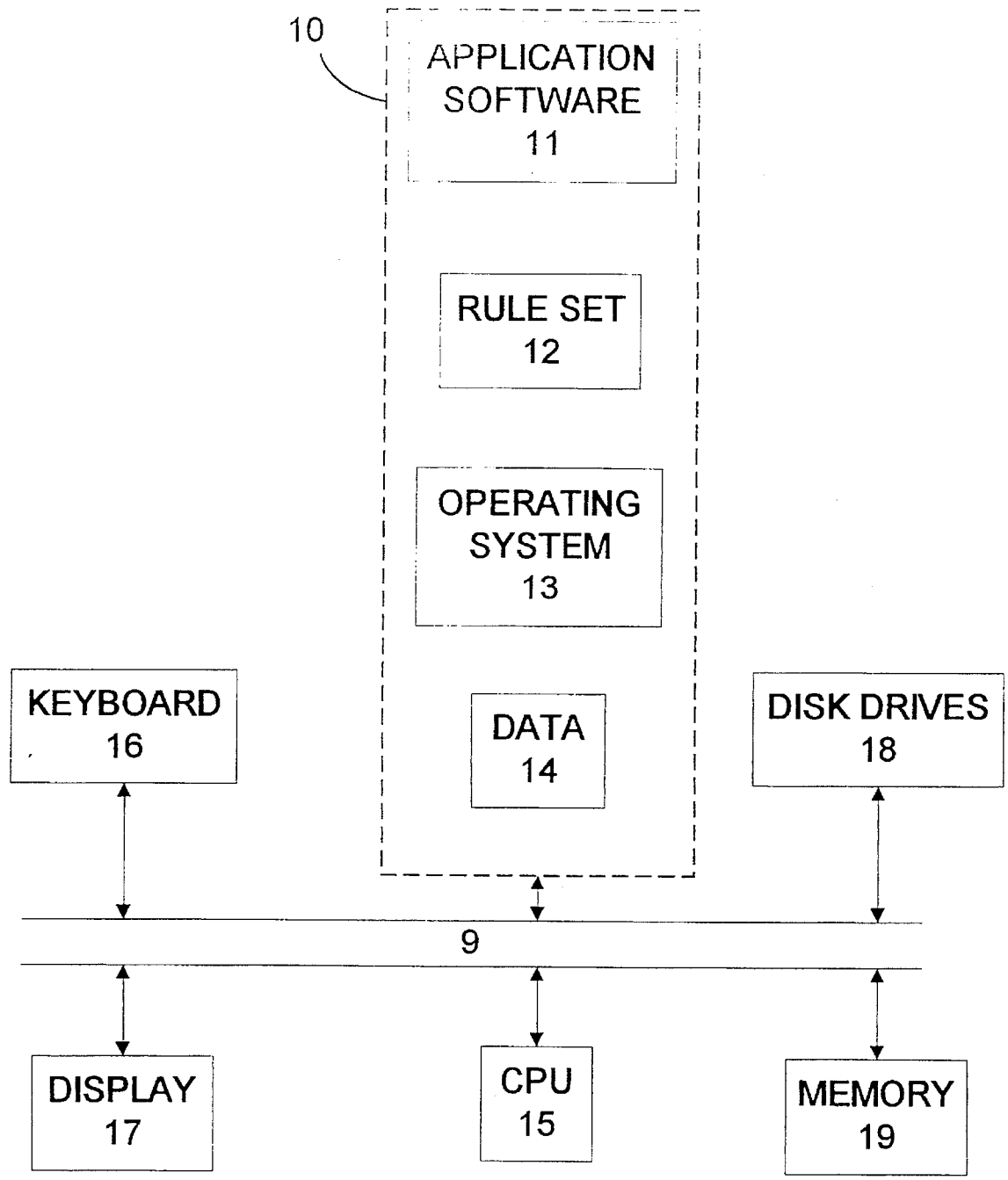
FIG. 1 is a block diagram of a computing system according to the present invention.

FIG. 1 shows one embodiment of a computing system wherein application software is operated in a safety critical environment.

The computing system includes the central processing unit 15 which is preferably a microprocessor or microcontroller, such as an INTEL 486 or Pentium processor, a Motorola 26XXXX processor or a Power PC processor. The CPU 15 is connected via bus 9 to random access memory (RAM) 19, disk drives 18, keyboard 16, display 17 and main memory 10. The memory 10 stores the loaded application software 11, a set of safety critical rules 12, which will be described hereinafter, the computing system operating system 13 and data 14. The memory 10 can be non-volatile RAM which maintains its contents after the initial loading, it can be more than one memory or more than one different type of memory.

Memory 10 stores the application software which includes the instructions used to control the application specific functions in conjunction with the CPU 15 under the control of the operating system 13 and out of safety critical rules 12.

The operating system, which is also stored in memory 10, has all of the functional elements for carrying out executive functions, such as multi-tasking, memory management, scheduling, exception handling, interrupt handling and supervisory level operations. In addition, the critical operating system has a link to the set of safety critical rules 12 stored in memory 10. The operating system verifies that each operation associated with those rules is performed as defined.

The operating system also monitors the application software in a time stealing mode to insure that the application specific instructions are correct, that the use of RAM 19 is correct, that the instruction set of CPU 15 operates as defined and that the application software is cycling.

The safety critical rules that are supplied with the application software establish the level of safety criticality by setting forth which safety critical operations must be followed (see FIG. 2) and the limits imposed on those safety critical operations.

The rules set forth an evaluation of events that occur in the computing system and by linking these rules to the operation of the operating system, the evaluation is tied to the event itself.

The safety critical rules include I/O limitations, requirements for I/O interactions at a gross level, requirements for I/O timing, requirements for I/O feedback, requirements for operational calculations and requirements for responses from the user interface and the specific application specific operations. The operating system can respond to a failure by causing a system or user alert or alarm and/or by forcing a set of outputs applied to bus 9 into a rule defined level, such as all zeroes or all ones.

The operating system can also perform all applicable testing of its own operation, to verify its own operation.

Figure 2:
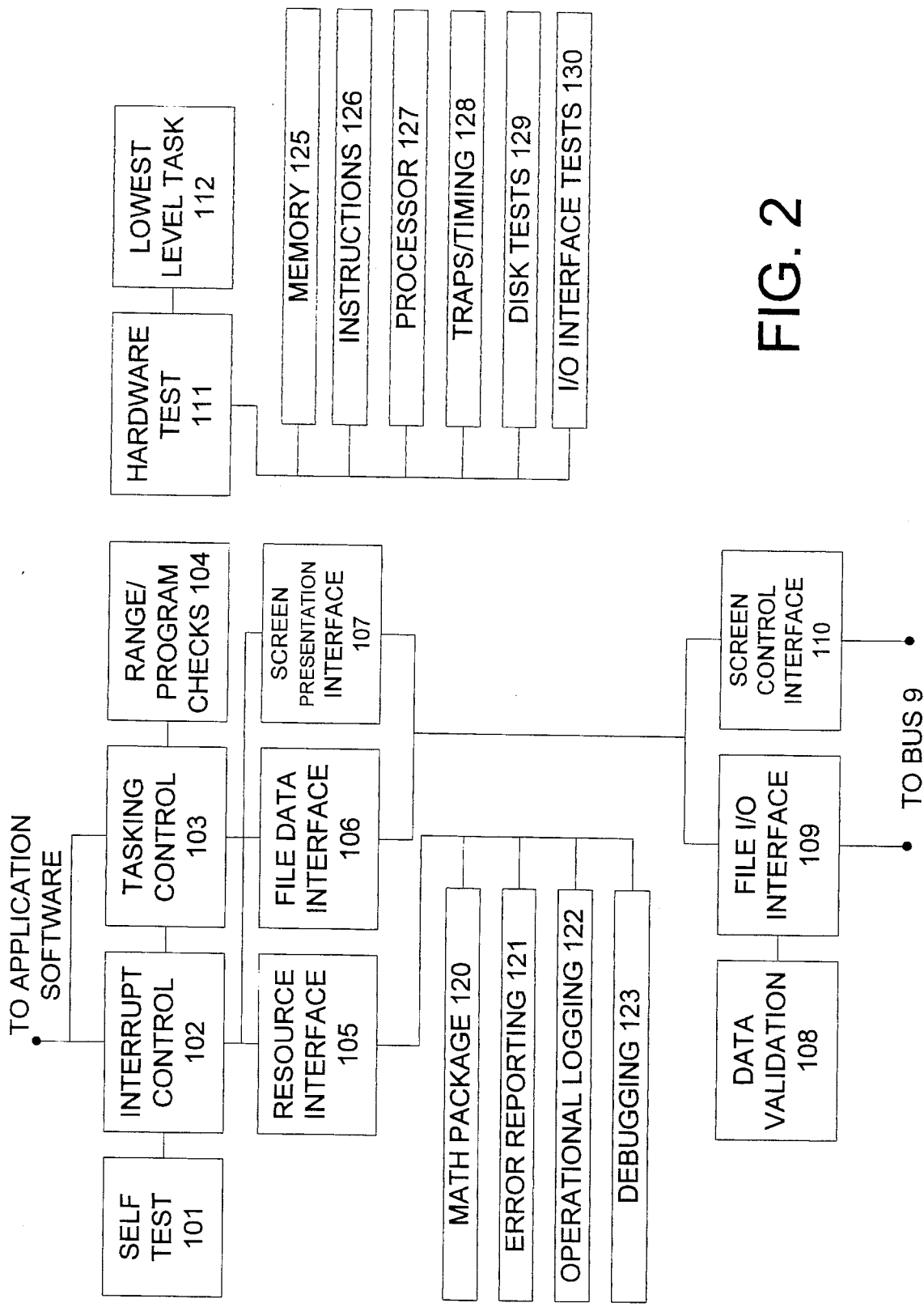
FIG. 2 is a diagram of the safety critical operations carried out by the computing system in accordance with the safety critical rules.

The functions of the safety critical computing system are shown in the block diagram of FIG. 2. As shown therein, the safety critical operating system has various functional blocks which carry out the safety critical functions defined by the safety critical rules.

Specifically, the operating system has an application software interface which interacts with the application software. The application interface includes interrupt controls 102 and tasking controls 103 and has a self-testing section 101 which acts to make sure that the operating system itself is operating properly and range and program checking 104 on the application software to check the integrity thereof according to the criteria set by the rule set. The application software interface operates in the foreground, whereas all of the other safety critical functions are operated in the background so that they are transparent.

The application interface interacts with a file data interface 106 and a screen presentation interface 107 as well as a resource interface 105.

The resource interface controls a math package 120 which insures that the accuracy of the computing system is sufficient for the particular application software and the requirements of the rules set. Thus where typical accuracy is 8 bits, the math package 120 can provide up to 32 bits or more of accuracy if necessary. The error reporting section 121 provides an on the spot report of any error detected by the operating system. The operation logging section 122 keeps a record of all checking carried out by the operating system which can then be accessed from memory at a later time. Finally, the debugging section 123 acts to attempt to remove errors when recognized by the operating system.

The operating system also includes the file input/output interface 109 which interacts with the input/output circuit 7 to send and receive data to the user interface and to the application software. The data validation section 108 performs double copy compares for each read and write to the memory. The screen control interface 110 also interacts with the input/output circuit 7 and controls all data sent to the screen or display to insure that the display is accurate under the criteria of the rules set.

The operating system further includes a hardware testing section 111 which performs continuous hardware checking and validation, defined as the lowest level task in the system by section 112. The hardware testing section 111 includes a section 125 for testing memory, and performs a cyclical redundancy check on all data 14 in memory 10. Section 126 checks the integrity of instruction registers and section 127 checks the integrity of the CPU in the system to insure that it is operating properly. The section 128 checks the traps and timing including the system clock to make sure they are operating correctly, section 129 tests disk drives and section 130 tests the I/O interface.

In use, the application software interface will interface all other facilities to the application software. The application software will request mathematical calculations, data read and/or write, activity logging or screen presentation and action initiation when a screen choice is made. The requests are accepted by the application software interface which then transfers the requests to the proper operating process within the operating system along with any required logging or checking action. Responses to the requested operation are returned by the application software interface to the application software.

For example, if there is a request to write a record to a file, this would cause the record to be transferred to operational logging 122 and to the file I/O interface 109. Additionally, the debugging section 123 is activated and the contents of the write are analyzed to determine if it contains the desired data. These safety critical functions are enabled in accordance with the rules set.

The self test 101 performs testing of the operating system itself. It causes sanity checks with each of the other processes through a defined protocol of information transfer and performs a cyclical redundancy check over the memory space occupied by the operating system. This process performs its operations as frequently as required by the rules set. Thus, the greater the level of safety criticality, the more frequently the self-testing would be performed.

The range/program checks 104 perform data verifications of range, field type, etc., in accordance with the requirements set by the safety critical rules, on data that is operated on by the mathematical package 120 where data sent to or retrieved from the file I/O interface 109 and screen control interface 110. Additionally, this verifies the section of the application software accessed in memory by a cyclical redundancy check and by size validation.

The tasking control 103 acquires the application software and validates it using the range/program checks 104. It then logs its initiation in operational logging 122 and starts the application software. For application software keyed to screen responses, this process will acquire those sections and validate them prior to execution.

The file data interface 106 translates generic data read/write requests into the file activities contained in the file I/O interface 109. For example, when the modified application specific program logic requests the reading of a record in a database with a specific key, it will have that request translated to a series of commands required by an active random access keyed database program.

The screen presentation interface 107 translates a generic screen layout containing response keys and fields into the screen presentation activities contained in the screen control interface 110. Thus, a screen layout containing radio buttons or fields to be entered or selection buttons or action buttons is described by the modified application specific program logic and is then translated into a series of commands required by the user interface.

The data validation 108 adds a cyclical redundancy check to every written record and validates every record read when required by the rules set. It controls information to insure the data has not been modified or accidentally destroyed.

The file I/O interface 109 performs the actual calls for reading and writing to RAM 19. This will handle all random, keyed and sequential accessing of data and all formatting of the generic records into system dependent record requests. Additionally, the file I/O interface uses the data validation 108 to validate the data read and written to insure that data failures are recognized when required by the rules set.

The screen control interface 110 performs the actual calls for presenting screen displays to the user interface and for receiving response inputs from the user interface and computing system. This handles the formatting of the generic screen and its presentation elements, such as radio buttons, menu selections, data fields, etc. which are compatible with the computing system's presentation method.

The resource interface 105 controls access to a set of capabilities offered by the operating system and which supports the operation of the application software. These capabilities include the math package 120, which supports statistical calculations and multiple accuracy calculations and insures that accuracy levels are consistent for application calculations that require specific calculation tolerances set by the safety critical rules. The error reporting 121 defines the method of reporting determined errors. The operation logging 122 logs all desired activities and errors, and the debugging 123 allows the set of rules to define data conditions or error conditions and requests identification of where and when they occur, for aiding and determining problems with the application software.

The math package 120 offers a system independent set of math routines, which will support statistical operations and calculations requiring accuracy levels which are different with different platforms. The error reporting 121 passes all errors encountered and reports them to either the operational log 122 and/or the user in a consistent manner. The operational logging 122 generates an activity log which includes which segment of the application software was executing, data record modifications and/or access, screen presentations and operator responses, etc. This log is used for review by the user application of daily activities or can be used by a governing agency for verification of proper operation of the computing system. A special signature can be recorded with the records to insure that the records have not been tampered with. The debugging 123 allows a set of criteria in the rules to be applied to dynamic operations of the application software in order to aid in identifying problems with the computing system. These are recognition of incorrect data being written or read from the RAM, or a request for an incorrect screen presentation sequence.

The hardware testing 111 is an activity that occurs independently of the application software. The testing takes place on a time available basis to insure that the hardware is operating correctly. This includes a series of tests which verify the normal processing of the system and the integrity of the connected hardware.

The hardware testing includes memory testing 125 which insures that the RAM memory can be read and written with reliable retrieval of stored data. This operates in a non-destructive mode to insure no interference with application software operation and no interference with the operation of the computing system. Instruction testing 126 tests each of the processor instructions in various orientations with known operants and compares the results of the operation with expected results in order to verify proper operation of the CPU and to insure proper execution of the application software. The processor testing 127 checks the processor dependent operations to also insure proper execution of application software. Traps/timing testing 128 checks the clock timing and interrupt actions wherever possible on a non-interference basis to insure that timed activities and interrupt driven activities are operating properly and within criteria set by the rules. Disk testing 129 checks the hard drive or main storage device controller and drives on a non-interference basis to insure that disk read, disk write, and seek operations are operating properly. The input/output interface tests 130 check all input/output interface circuits.

Figure 3:
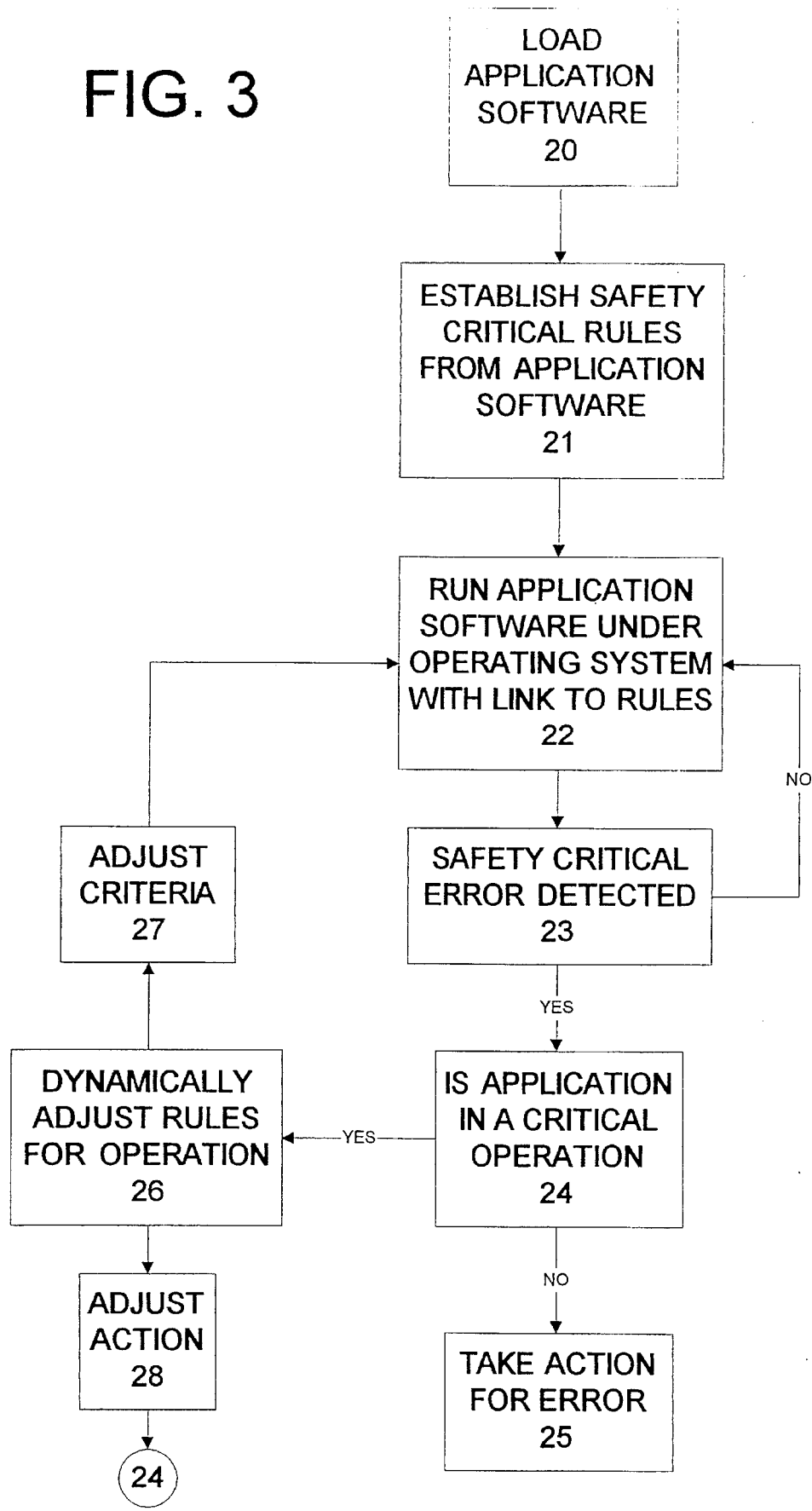
FIG. 3 is a flow diagram of the operations of the method according to the present invention.

FIG. 3 is a block diagram showing the manner in which the safety critical rules are dynamically changed during the running of the application software in the computing system of FIGS. 1 and 2.

The application software is loaded in step 20. This step can take place when the system is initially installed by the manufacturer either by being embedded in the system, stored in firmware of the computing system or loaded on a system hard drive. Alternatively, the software can be loaded at the user site when the equipment is being installed.

The application software includes the safety critical rules and these rules are established in step 21 in response to the loading of the software and optionally in response to further inputs via the keyboard 16 by the ultimate user, who may set limits as to ranges for critical parameters of the system that are determined by that user to be more appropriate than the limits established by the manufacturer.

The user established criteria can only be more restrictive than the limits set by the application software itself. Moreover, the application software preferably includes as part of the safety critical rule set, a numerical value representative of magnitude of criticality for the various functions that it carries out. The safety critical rules would then also include the criteria and/or adjusted actions for abnormal situations for each of the different values of criticality of various application specific functions.

In the next step 22, the application software is run under the operating system, which is linked to the rules in the manner set forth hereinbefore. As a result, the application specific functions of the application software are carried out and safety critical functions are performed by the computing system in the background.

If a safety critical error is detected in step 23 as a result of the failure of the system to satisfy the criteria set in the safety critical rules, the system in step 24 determines if the application is in a critical operation. If not, then the system takes the appropriate action for the particular safety critical error that has been detected in step 25. If, on the other hand, the application is in a critical operation as has been predetermined by the user, then the rules are automatically dynamically adjusted in step 26. Under certain circumstances, the rules can be adjusted by adjusting the criteria in step 27, for example, to relax the criteria and the application software continues to run in step 22 and the system sees if the safety critical error is detected again in step 23. If not, the application software continues to run as modified.

If after adjusting the criteria in step 27 the safety critical error is still detected in step 23, then the rules are dynamically adjusted by adjusting the action to be taken in step 28. Alternatively, if the error is of the type where the criteria cannot be adjusted, then the dynamic rule adjustment will be an adjustment to the action in step 28 without going through step 27.

After the action has been adjusted in step 28, the system continues to run, but the system now monitors in step 24 whether the application is still a critical operation. As soon as the critical operation is over, the normal action for the error is carried out in step 25.

For example, in a medication delivery system for a patient, the application software may utilize as the allowable range of medication delivery to be from 0 to 20 cc of the medication. The user may feel, based upon prior experience or the particular patients at the facility, that the range should be from 0 to 15 cc. Since a patient may die if the medication is stopped completely, the safety critical rules would include the rule that the adjusted action, when medication is being delivered to a patient, be the delivery of a minimum value of 3 cc. Thus, the system would never be shut off upon the detection of a safety critical error, but rather it would go into a non-zero minimum level delivery mode until the high criticality application specific function was ended. Then, if the application software indicated that it was permissible to turn off the medication delivery, the system would do so.

Table I summarizes the adjusted criteria and adjusted actions for various safety critical errors detected by the system. For example, when the system determines a range check error, that is, a value is beyond the limits of $k_1$ and $k_2$ set by the system, the normal action would be to temporarily halt the program and prompt the operator. In this case, the adjusted action would be to continue the operation within the range and timing limits.

Thus for an automatic ventilator system for aiding the breathing of a patient, if one of the safety critical errors are determined during the initial setup of the system for a patient, the system will take the normal action of either delaying, temporarily halting the application or permanently halting it and calling attention to the operator of the error. At this point, the operator might have the option of putting the ventilator on a manual control basis and still use it, with the knowledge that the software or hardware has a safety critical malfunction. On the other hand, if the ventilator is in use and is aiding a patient in his or her breathing, this would be considered a critical operation where the halting of the program even temporarily, might result in the death of the patient. Thus in this instance, for as long as the system is in the critical operation of aiding the breathing of the patient, the operation will continue within predefined range and timing limits. Thus if the system had the criteria of delivering air between two volume limits and between limits of cycles per minute, such would not be exceeded even if the application software called for such a change due to the safety critical error. Therefore, rather than stop the system, the system will prevent any attempt to operate outside of those limits while it is in the critical operation.

In an x-ray system, during the initial setup of the system for a patient, a safety critical error detection will result in the system being delayed or halted. However, if during the application of the radiation to the patient, an instruction test

TABLE I

| RULE | CRITERIA | ADJUSTED CRITERIA | ACTION | ADJUSTED ACTION |
| --- | --- | --- | --- | --- |
| RANGE CHECK | $k_1 \leq x \leq k_2$ | | temporarily halt program and prompt operator | continue operation within range and timing limits |
| PROGRAM TIMING | $t_1 \leq t \leq t_2$ | $t_1/2 \leq t \leq 2t_2$ | halt program | |
| INSTRUCTION TEST | single error | multiple error | delay program and run diagnostic tests | continue operation within range and timing limits |
| PROCESSOR TEST | single error | | halt program | continue operation within range and timing limits |
| TRAPS TEST | single error | | halt program | continue operation within range and timing limits |
| I/O TEST | single error | | halt program | continue operation within range and timing limits |
| DATA VALIDATION | single error | | halt program | continue operation within range and timing limits |
| MEMORY TEST | single byte error | multiple byte error | delay program and run diagnostic tests | continue operation within range and timing limits |

With regard to program timing errors, if the cycle time for the program is between $t_1$ and $t_2$ and an error is detected, the system might adjust the criteria to relax it to $t_1/2$ to $2t_2$ before taking the action of halting the program.

With regard to an instruction test or memory test, a single error criteria may be relaxed to accept a multiple error, and the action of delaying the program to run diagnostic tests, may be modified to continue the operation within range and timing limits until the critical operation is over.

For the processor test, the traps test, the I/O test and the data validation, while the criteria cannot be relaxed, the action can be modified to continue operation within the range and timing limits instead of halting the program while the application software is in a critical operation.

error is determined, rather than delay the operation and run diagnostic tests to determine the source of the error and perhaps prolong the radiation exposure of the patient, the system first allows either the adjusted criteria or the continued operation of the application but within range and timing limits to prevent prolonged exposure. In this way, the safety critical system itself would not cause prolonged exposure as a result of its own diagnostic testing and the safety critical system would prevent the error in the instructions from allowing the application software to prolong the exposure of the patient to the radiation beyond the predetermined range limits and timing limits set by the safety critical rules. Moreover, the system would not allow an abrupt termination of the radiation which would be equally dangerous. Instead, the adjusted action would be to reduce the radiation to a minimum value for a preselected short time before shutting the radiation off.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A method for operating application software in a safety critical environment, comprising the steps of:

loading application software into a computing system and including a set of safety critical rules for the application software each corresponding to criteria for safety critical operations to be performed by the computing system and actions to be taken in response to a failure to satisfy the criteria;

linking the computing system to the set of safety critical rules to verify that the safety critical operations performed by the computing system satisfy said criteria;

running the application software in the computing system, wherein the application software performs a plurality of application specific operations having differing levels of safety criticality;

performing safety critical operations as background functions during the running of the application software;

detecting a failure to satisfy criteria for a safety critical operation;

determining the application specific operation being currently performed; and adjusting the criteria, the action to be taken or both if the currently performed application specific operation is a predetermined operation.

2. The method according to claim 1, wherein the step of adjusting comprises first adjusting the criteria and thereafter adjusting the action to be taken.

3. The method according to claim 1, wherein the step of adjusting the criteria comprises relaxing the criteria.

4. The method according to claim 1, wherein the step of adjusting the action to be taken comprises continuing the predetermined application specific operation.

5. The method according to claim 4, wherein the step of adjusting the criteria comprises maintaining preselected range and timing limits.

6. The method according to claim 1, wherein the step of adjusting the action to be taken comprises continuing the predetermined application specific operation without any delay.

7. The method according to claim 6, wherein the step of adjusting the criteria comprises maintaining preselected range and timing limits.

8. The method according to claim 1, wherein the step of adjusting the action to be taken comprises continuing the predetermined application specific operation at a non-zero minimum level.

* * * * *